Feb. 25, 1969
D. M. MacMILLAN
3,429,005
SECTIONAL TIRE MOLD
Filed April 11, 1963
Sheet 1 of 5
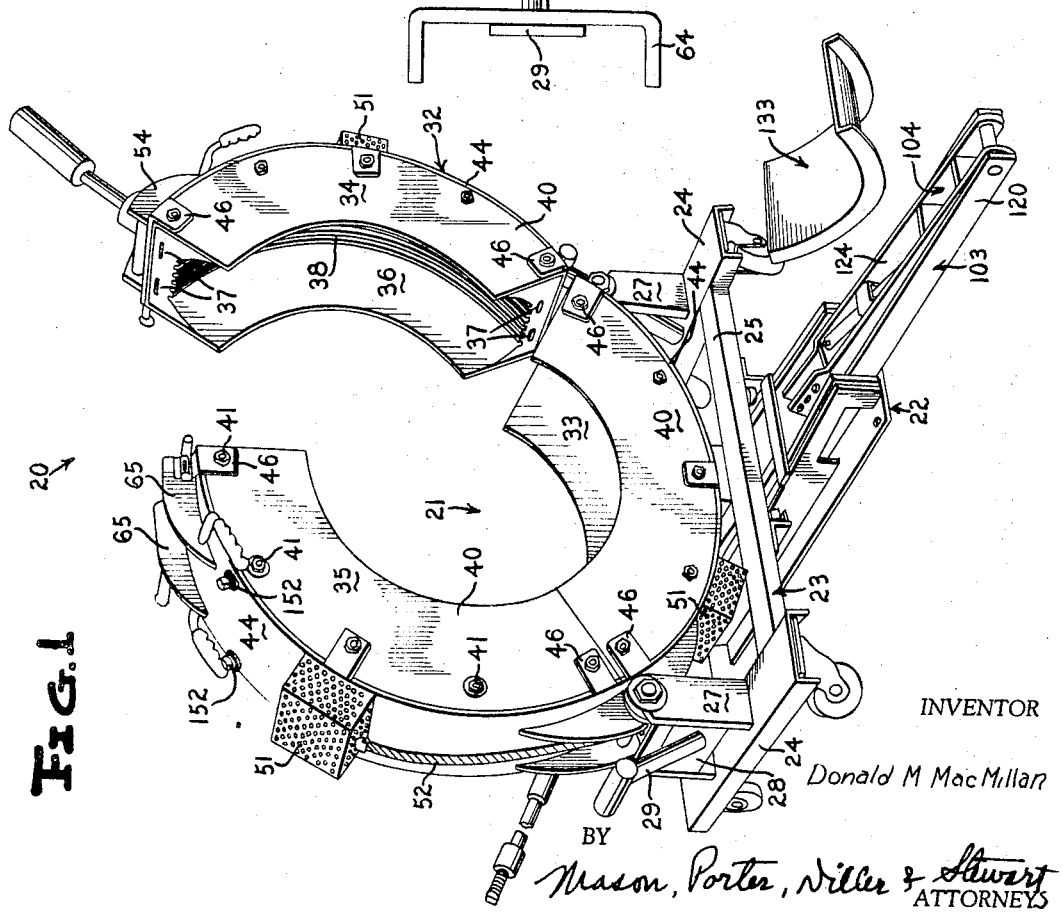
INVENTOR
Donald M. MacMillan
BY
Mason, Porter, Diller & Stewart
ATTORNEYS

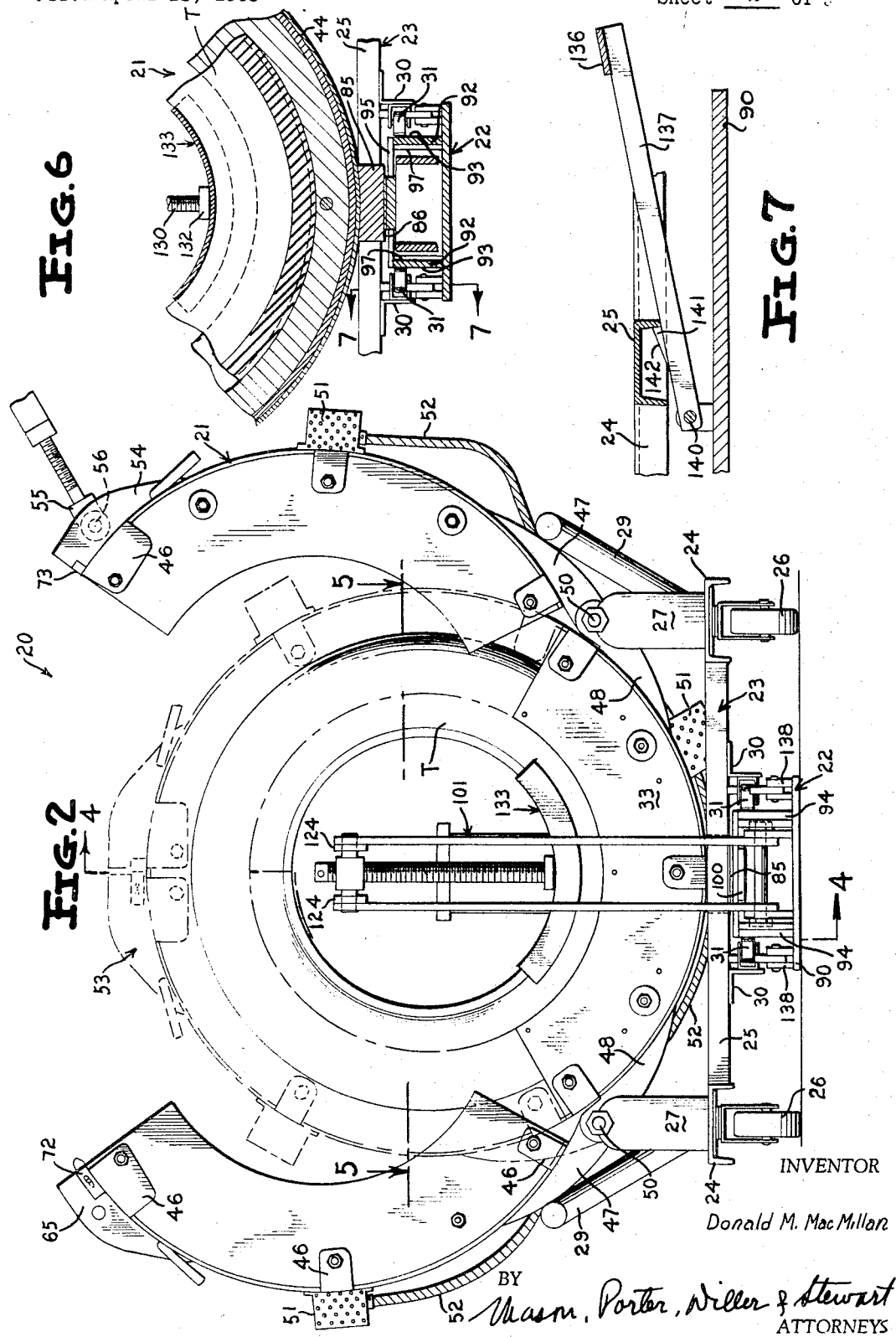

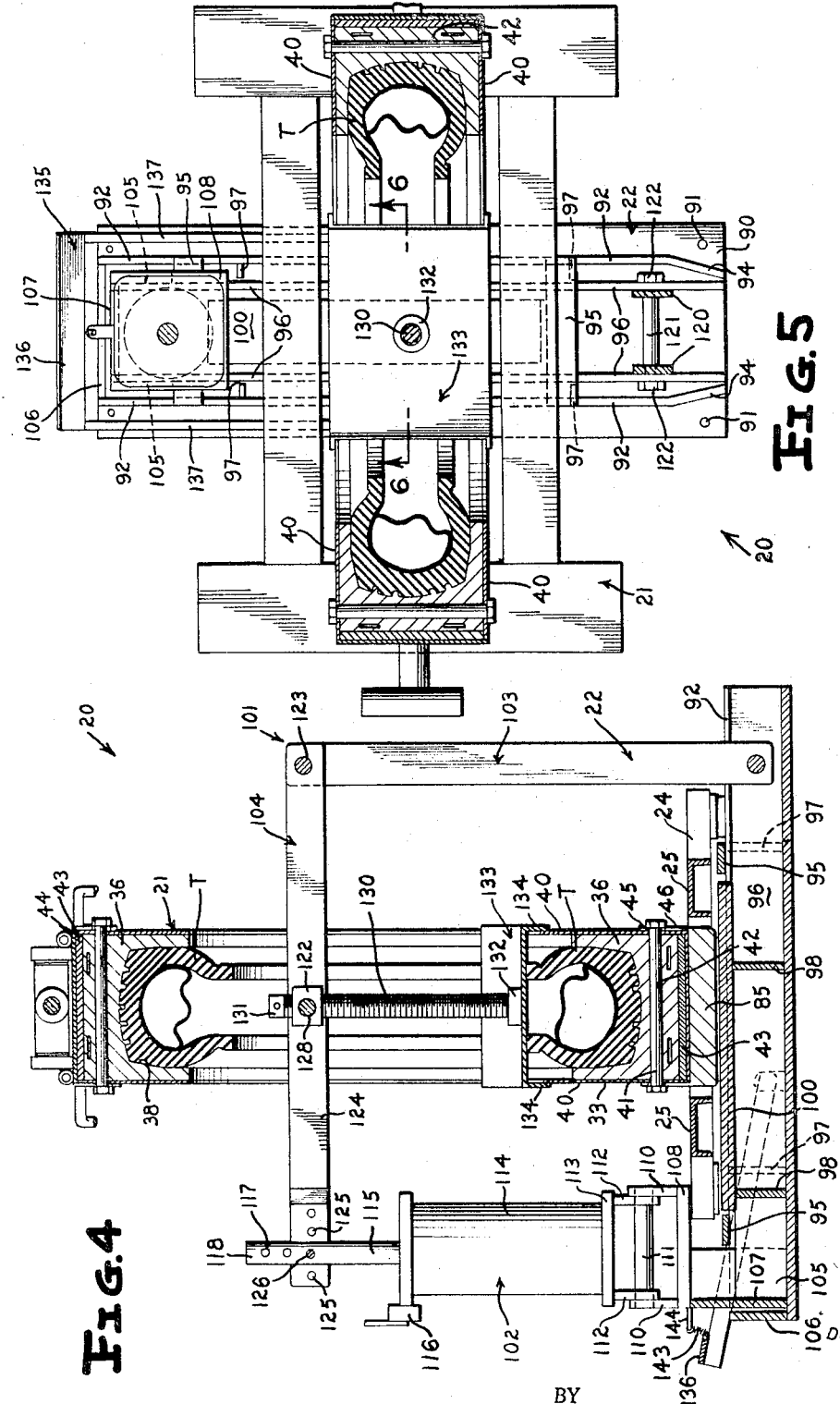

Feb. 25, 1969 D. M. MacMILLAN 3,429,005
SECTIONAL TIRE MOLD
Filed April 11, 1963 Sheet 4 of 5

INVENTOR
Donald M. MacMillan
BY Mason, Porter, Diller & Stewart
ATTORNEYS

Feb. 25, 1969     D. M. MacMILLAN     3,429,005
SECTIONAL TIRE MOLD
Filed April 11, 1963                           Sheet 5 of 5
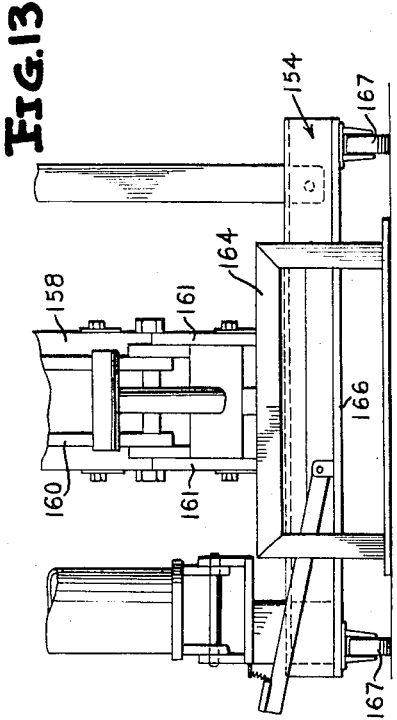
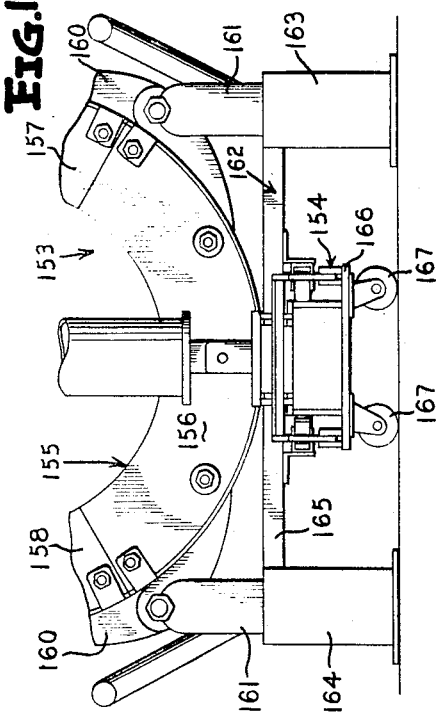
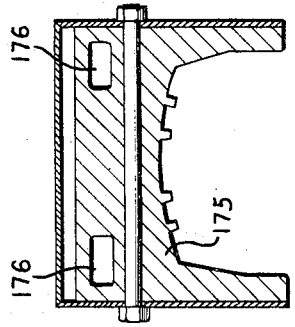
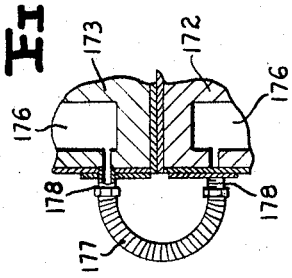
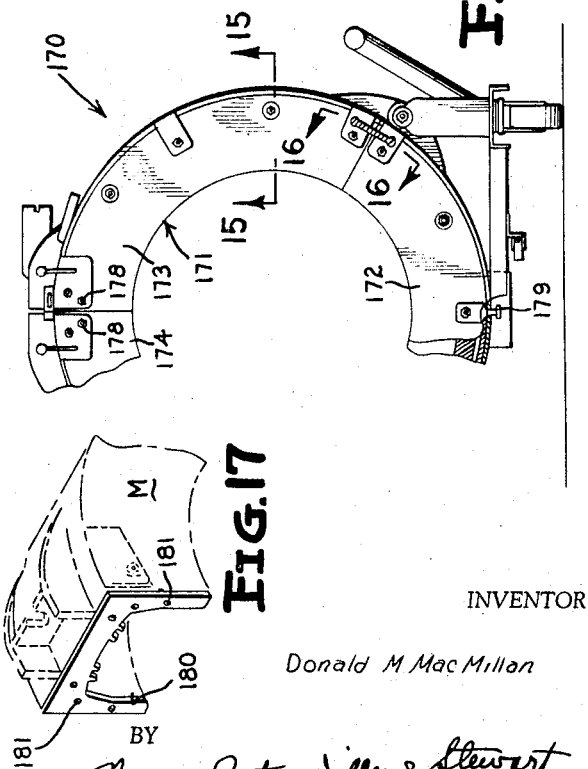
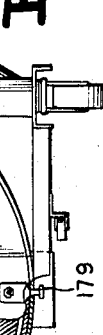
INVENTOR
Donald M MacMillan
BY Mason, Porter, Diller & Stewart
ATTORNEYS

United States Patent Office 3,429,005
Patented Feb. 25, 1969

3,429,005
SECTIONAL TIRE MOLD
Donald M. MacMillan, Box 557, Macon, Ga. 31207;
Kenneth T. MacMillan, executor of said Donald M.
MacMillan, deceased
Filed Apr. 11, 1963, Ser. No. 272,376
U.S. Cl. 18—18                                    10 Claims
Int. Cl. B29h 5/02

This invention relates to a novel mold including a sectional matrix in which a tire is inserted to be subsequently cured.

Another object of this invention is to provide a novel mold of the type above-described wherein the matrix is provided with an additional or second movable matrix section, the second movable matrix section including means for breaking the tire away from the matrix after the tire has been cured when the second member is moved into another position of operation.

Still another object of this invention is to provide a novel mold of the type heretofore mentioned in which the matrix is additionally provided with a central immovable matrix section, a respective hinge securing the first and second movable matrix sections to the immovable central matrix section and the hinge axes of the hinges being below a plane of contact between the central matrix section and each of the first and second movable matrix sections whereby pinching hinge motion between the matrix sections is precluded.

With the above, and other objects in view that will hereinafter appear, the nature of the invention will be more clearly understood by reference to the following detailed description, the appended claims and the several views illustrated in the accompanying drawings:

In the drawings:

FIGURE 1 is a front perspective view of a mold and loader structure therefor, and illustrates the loader structure, or loader of this invention underlying a central matrix section of a sectional matrix of the mold, one of a plurality of the matrix sections of the matrix being pivoted or hinged opened and an arcuate bead plate prior to being positioned on a bead of a tire when the loader is employed to set or force a tire in the matrix.

FIGURE 2 is an enlarged front elevational view of the mold and loader of FIGURE 1, and shows in phantom lines the substantially annular configuration of the matrix, a portion of the loader spanning a central section of the matrix, a threaded member forming a part of the spanning member engaging the bead plate positioned on a bead of a tire in the matrix, cooperative guide means on the mold and the loader for accurately aligning the loader with respect to the mold and in solid lines, the position of two hinged matrix sections of the sectional matrix prior to inserting a tire in the matrix.

FIGURE 3 is a top plan view of the mold and loader of FIGURE 2 when the sectional matrix has been closed, and illustrates a locking mechanism for securing the matrix sections together when a tire is being cured.

FIGURE 4 is a vertical jump sectional view taken along line 4—4 of FIGURE 2, and more clearly illustrates the components of the loader including a base, spanning means including a first arm, a second arm and a third arm connected between the first and second arms, the first arm being a cylinder having a reciprocal piston rod therein, and the threaded member being swivelly secured to the third arm with an end portion thereof in contact with the bead plate overlying the bead of the tire in the sectional matrix.

FIGURE 5 is a cross-sectional view taken along lines 5—5 of FIGURE 2 when the sectional matrix is closed, and illustrates the underlying relationship of the loader with respect to the sectional matrix, and the position of the bead plate upon the beads of the tire in the matrix.

FIGURE 6 is a fragmentary sectional view taken along line 6—6 of FIGURE 5, and illustrates a matrix pad secured to the matrix of the mold and a floating pad of the loader in contact with the matrix pad during the setting of a tire in the matrix.

FIGURE 7 is an enlarged fragmentary sectional view taken along line 7—7 of FIGURE 6, and illustrates a locking arm having a locking latch securing the loader to a rail forming a portion of the base of the mold.

FIGURE 12 is a fragmentary front elevational view of another mold and loader structure therefor, and illustrates the loader structure mounted on a plurality of casters and a sectional matrix of the mold supported on a stationary base.

FIGURE 13 is a side elevational view of the mold and loader structure of FIGURE 12, and more clearly shows the relationship between the mold and the loader during the setting or urging of a tire in the sectional matrix.

FIGURE 14 is a fragmentary front elevational view of a mold, similar to the mold of FIGURE 8, and shows a sectional matrix provided with steam passages, a drain plug and a jumper hose between adjacent matrix sections of the matrix.

FIGURE 15 is an enlarged sectional view taken along line 15—15 of FIGURE 14, and more clearly illustrates the steam passages in the matrix of the mold.

FIGURE 16 is an enlarged fragmentary sectional view taken along line 16—16 of FIGURE 14, and more clearly illustrates the construction of the jumper hose between adjacent matrix sections of the matrix.

FIGURE 17 is a perspective view of an end shim attached to a face of one of the matrix sections, shown in phantom outline, and illustrates the general contour of the end shim.

Figure 8:
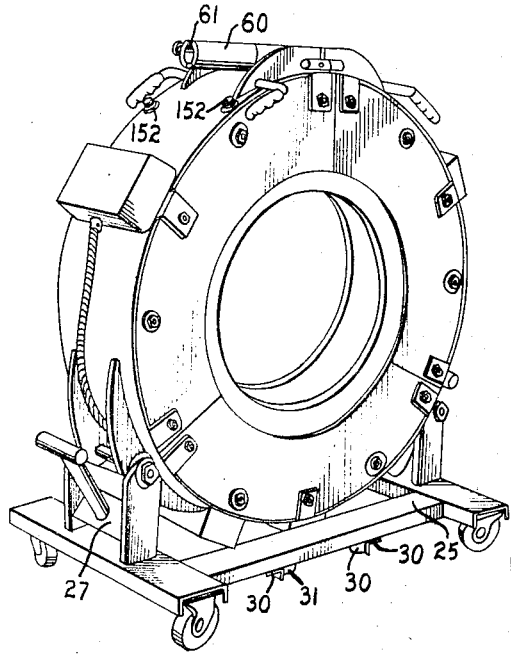
FIGURE 8 is a front perspective view of the mold, and illustrates the matrix sections thereof locked together during the curing of a tire in the mold.

A mold and a loader constructed in accordance with this invention is best illustrated in FIGURES 1 through 10 of the drawings, and is generally designated by the reference numeral 20. The mold and loader 20 includes a mold 21 and a loader 22.

The mold 21 comprises a base 23 including a pair of inverted U-shaped base channel bars 24 secured in parallel relation to each other by a pair of spaced parallel channel bars 25, also of a substantially U-shaped inverted configuration. An identical caster 26 is secured to an end portion of each of the base channels 24. A pair of identical hinge plates 27 are secured to each of the base channels 24 in upstanding relationship thereto and parallel to each other. A matrix stop brace 28 is secured between the hinge plates of each pair of hinge plates 27. A substantially T-shaped matrix stop 29 is welded to each of the matrix stop braces 28 for a purpose to be described more fully hereafter.

A pair of identical angle bars 30 (see FIGURES 1, 2, 6 and 8) are secured to each of the channel bars 25. Each of the angle bars 30 carries a rotatable guide roller 31, the axis of which is normal to the plane of the base frame 23. The plurality of guide rollers 31 form guide means cooperative with the loader 22 for a purpose to be hereinafter described.

The mold 21 includes a sectional matrix assembly 32 comprising a central immovable matrix section 33, a first movable matrix section 34 and a second movable matrix section 35. The first movable matrix section 34 and the second movable matrix section 35 are each hingedly secured to the immovable central matrix section 33 in a manner to be hereafter described. Each of the matrix sections or matrices 33 through 35 includes an identical matrix body 36 which is constructed of aluminum and includes a pair of cast-in heating elements 37. Each of the matrices 33–35 has an internal surface 38 contoured to the general external cross-sectional configuration of a tire T (see FIGURES 4 and 5) which is retreaded and cured in the mold 21. An identical plate of insulating material 40 is secured to each side of each of the matrices 33–35 by a plurality of identical matrix bolts 41 passing through a respective one of a plurality of bores 42 in each of the matrices 33, 34 and 35. Another strip of insulating material 43 overlies each of the matrices 33–35 between each of the pair of insulating strips or plates 40 and combined therewith to prevent heat loss during the curing operation of the mold 21.

Each of the strips of insulating material 43 is secured to a respective one of the matrices 33–35 by an identical, steel matrix band 44 provided with a pair of identical lugs 46. Each of the lugs 46 is provided with an aperture 45 through which an associated one of the plurality of matrix bolts 41 passes. Each of the apertures 45 in the plurality of lugs 46 is larger than the diameter of the matrix bolts 41 to permit each of the matrix bands 44 to be shifted with respect to the matrices 33–35 in a manner and for a purpose to be more fully described hereafter.

A pair of identical hinge plates 47 are welded to each matrix band 44 of the matrix sections 34 and 35. A similar pair of hinge plates 48 are welded to the immovable central matrix section 34. A hinge pin 50 is supported between each pair of hinge plates 27 of the base frame 23, and through each associated pair of hinge plates 47 and 48 to pivotally mount the matrix sections 34 and 35 with respect to the central matrix section 33 in a manner clearly shown in FIGURE 2 of the drawings.

An identical switch box 51 is suitably attached to each matrix band 44. Each of the switch boxes 51 covers a heating element terminal (not shown) of each of the matrix heating elements 37. A conduit 52 is connected in series between the heating element terminals of the heating elements 37 and connected to a suitable source of electrical energy. Although not shown, each of the switch boxes 51 has adjusting screws for setting a desired curing temperature and a pilot light which goes off when a desired temperature is reached. When the desired curing temperature of the mold 21 is reached, the pilot light goes off and if at any time thereafter a failure occurs in the electrical system which causes the temperature of the mold 21 to fall below the desired curing temperature, the pilot light relights to indicate or warn of a defective condition in the electrical system.

A trunnion or locking assembly 53, as is best illustrated in FIGURES 1, 2, and 3 of the drawings, includes a pair of spaced locking trunnion plates 54 welded to the matrix band 44 of the matrix section 34. A T-shaped locking trunnion 55 is rotatably journalled on a locking trunnion pin 56 rotatably journalled between the locking trunnion plates 54. The T-shaped locking trunnion 55 includes a threaded extension 57. A thrust washer 58 is slidably received on the threaded extension 57 while an elongated trunnion nut 60 is threaded upon the trunnion extension 57. A pair of opposed elongated slots 61 (see FIGURE 8) are formed in the trunnion nut 60 to receive a pair of detents 62 of a locking handle 63. The locking handle 63 includes a substantially U-shaped gripping portion 64.

A pair of identical spaced apart trunnion brackets 65 are each secured to the matrix band 44 of the matrix section 35. A locking plate 66 having an upwardly opening slot 67 (see FIGURES 9 and 10) is secured between the trunnion brackets 65.

Figure 9:
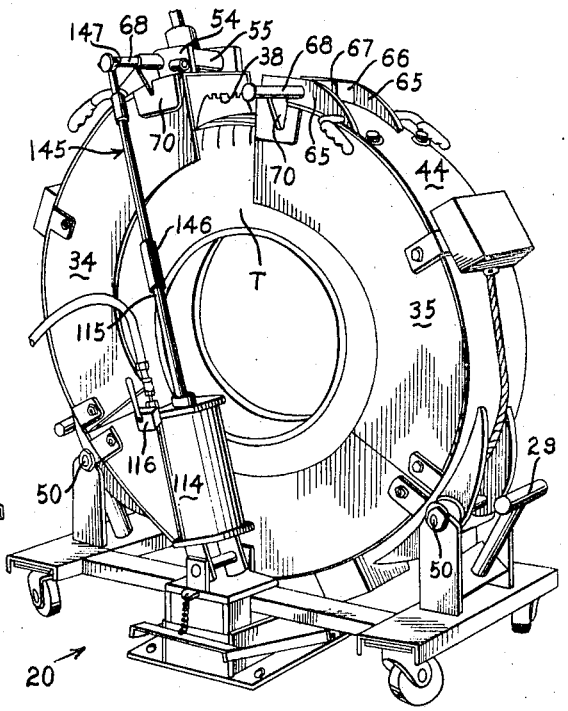
FIGURE 9 is a front perspective view of the mold and loader of this invention, and illustrates a removable push rod secured to the reciprocal piston rod of the first member, the push rod having a bifurcated terminal portion engaging a pin secured to a hinged matrix section of the sectional matrix to break the same away from the now cured tire.

As is best illustrated in FIGURES 3 and 9 of the drawings, an identical opening pin 68 is secured to one of the locking trunnion plates 54 and one of the trunnion brackets 65. The opening pins 68 are each braced by a reinforcing bracket 70 (see FIGURE 9). A substantially L-shaped gripping handle 71 is secured to each of the trunnion brackets 65 and the locking trunnion plates 54.

Figure 11:
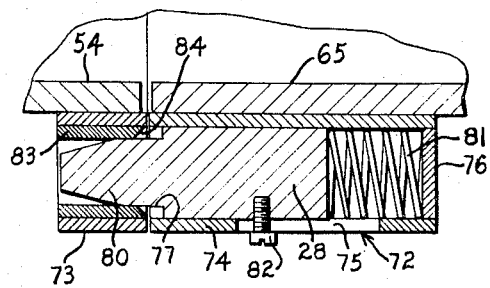
FIGURE 11 is an enlarged fragmentary sectional view of an aligning device, and illustrates a body portion carrying a spring biased detent secured to one matrix section and a detent receiving sleeve secured to another section of the matrix.

An aligning device 72 is welded to each of the trunnion plates 65 in cooperative relationship with a socket 73 welded or otherwise secured to each of the locking trunnion plates 54. As is best illustrated in FIGURE 11 of the drawings, each of the aligning devices includes a substantially tubular body 74 having an elongated slot 75, a closed end 76 and an opening 77 opposite the closed end 76. The body 74 is welded or otherwise secured to the trunnion bracket 65 and slidably carries an aligning pin 78 having an integral tapered aligning head 80 protruding outwardly of the opening 77. The body 78 is biased by a compression spring 81 to the position illustrated in FIGURE 11; a screw 82 threadably received in the body 78 is held captive in the slot 82 and thereby limits the outward projection of the tapered head 80.

Each of the sockets 73 is welded to one of the locking trunnion plates 54 in alignment with the tapered head 80 of the aligning device 72. A sleeve 83 having a tapered peripheral portion 84 is press-fit in the socket 73.

The mold 21 is moved from the solid line position of FIGURE 2 to the phantom outline position thereof by grasping the L-shaped gripping handles 71 of the movable matrix sections 34 and 35, and pivoting these matrix sections about the respective hinge pins 50. It is important to note that the hinge pins 50 are each located below a plane of contact of the central matrix section 33 and each of the movable matrix sections 34 and 35. This location of the hinge pins 50 permits the matrix sections 34 and 35 to close with a sweeping motion instead of a pinching motion, thus preventing the camelback on the built-up portion of a tire within the mold 21 from being torn by the tread designed internal surface 38 of the matrix sections 34 and 35. After the movable matrix sections 34 and 35 have substantially reached the phantom outline position of FIGURE 2, the T-shaped trunnion 55 is pivoted about the trunnion locking pin 56 until the threaded extension 57 seats in the bottom of the upwardly opening slot 67 of the locking plate 66. The trunnion nut 60 is threaded upon the extension 57 by employing the locking handle 63 to rotate the trunnion nut in a manner clearly illustrated in FIGURE 3. The thrust washer 58 between the trunnion nut 60 and the locking plate 66 decreases the frictional area of the trunnion nut 60 and thus permits easier locking of the locking or trunnion assembly 53.

Prior to closing the mold 21 in the manner above-discussed, a built-up tire is placed in the central matrix section 33 and forced or urged therein by the loader or loader structure 22 in a manner to be hereafter discussed. As will appear shortly, one function of the loader 22 is to apply a desired force to the central matrix section 33 of the mold 21 to set the tire therein.

A matrix pad 85 (see FIGURES 1, 2 and 6) is welded to the matrix band 44 of the central matrix section 33 so that the force applied by the loader 22 is effectively transmitted to the central matrix section 33. As is best illustrated in FIGURE 6 of the drawings, the matrix pad 85 includes a lower surface 86 which depends slightly below the channel bar 25 of the base frame 23. In addition, the matrix pad 85 is positioned between the guide rollers 31 secured to the base frame 23 by the angle brackets 30. The position of the lower surface 86 of the matrix pad 85 and the position of the matrix pad 85 with respect to the guide rollers 31 cooperate in a novel manner to accurately and effectively set a tire in the central matrix section 33 as will hereinafter appear.

The loader or load structure 22 includes a loader base plate 90 which is of a substantially rectangular configuration. The base plate 90 is provided with a plurality of identical apertures 91 through which a plurality of bolts (not shown) are insertable for securing the base plate 90 to a supporting surface. A pair of elongated guide rails 92 each having a guide surface 93 (FIGURE 6) are welded to the base plate 90 of the loader 22. End portions 94 of the guide rails 92 converge toward each other to facilitate the guiding alignment of the base frame 23 of the mold 21 with respect to the loader 22 in a manner to be described more fully hereafter. A pair of identical guide rail braces 95 are secured between and atop the guide rails 92. A pair of back jack connecting arms 96 rest upon the base plate 90 between the guide rails 92. The back jack connecting arms 96 are freely movable with respect to the base plate 90 and any movment thereof transverse of the base plate 90 is limited by a plurality of identical back jack connecting arm guides 97 secured to each of the guide rails 92 (see FIGURES 5 and 6). The back jack connecting arms 96 are secured together by a pair of back jack connecting arm braces 98 (FIGURE 4). A substantially elongated rectangular floating pad 100 is welded atop the back jack connecting arm braces 98 of the back jack connecting arms 96. The longitudinal movement of the back jack connecting arms 96 with respect to the base plate 90 is limited by the abutment of the floating pad 100 with the respective guide rails braces 95 between the guide rails 92, as is best shown in FIGURE 4 of the drawings. The upward movement of the back jack connecting arms 96 is also limited by the guide rail braces 95. That is, as shown in FIGURE 4 of the drawings, the movement of the back jack connecting arm 96 is limited by the abutment of an uppermost edge thereof with the underside of each of the guide rail braces 95.

The loader 22 includes means 101 for spanning the immovable central matrix section 33 of the mold 21. The spanning means 101 includes a first member 102, a second member 103, and a third member 104 connected between the respective first and second members 102 and 103. The first member 102 includes a pair of upstanding platform braces 105, each of the platform braces 105 being welded or otherwise secured to a respective one of the back jack connecting arms 96 adjacent an end plate 106 secured between the guide rails 92. Another upstanding platform brace 107 is secured to the back jack connecting arms 96 adjacent the end plate 106. The platform braces 105 and 107 copoerate to form a substantially U-shaped upstanding brace atom which is secured a substantially square platform 108. A pair of hinge plate 110 are secured to the platform 108 and are journalled by a pin 111 to a pair of hinge plates 112 depending from a bototm plate 113 of an air cylinder 114. The air cylinder 114 includes a reciprocal piston rod 115, the direction of movement of which can be changed by an air valve 116 carried by the air cylinder 114 in a manner well known in the art. A plurality of adjusting apertures 117 are formed in an upper end portion 118 of the piston rod 115.

The second member 103 includes a second pair of connecting arms 120 journalled between the back jack connecting arms 96 by a connecting arm pin 121. The connecting arm pin 121 is threaded at the terminal portions thereof and a pair of nuts 122 secure the connecting second arms 120 with respect to the back jack connecting arms 96. A second connecting arm pin 123 secures the second member 103 to the third member 104.

The third member 104 of the spanning means 101 includes a pair of spaced air cylinder connecting arms 124 journalled at one end thereof by the second connecting arm pin 123 to the second member 103, and at an opposite end thereof, the air cylinder connecting arms 124 are each provided with a plurality of alignment apertures 125. A removable connecting arm locknig pin 126 is passed through a selected one of each of the plurality of alignment apertures 117 and 125. A loading screw swivel 127 is journalled between the air cylinder connecting arms 124 by a pair of identical integral swivel pins 128. A loading screw 130 has an upper end portion 131 threadably received in the loading screw swivel 127, and a lower end 132 terminating in an enlarged head. The headed end portion 132 of the loading screw 130 bears against an arcuate bead plate 133 provided with a pair of depending flanges 134 which are spaced apart a distance slightly greater than the width of the central matrix section 33 of the mold 21 for a purpose to be hereinafter described.

As is best illustrated in FIGURES 2, 4 and 5 of the drawings, a substantially U-shaped locking arm 135 having a foot pedal portion 136 and a pair of spaced, parallel locking arms 137 is pivotally attached to the base plate 90 by a pair of locking arm hinge plates 138 and an associated locking hinge pin 140. One of the locking arms 137 (see FIGURE 7) includes a lock member 141 having a camming surface 142. The locking member or latch 141 cooperates with the channel bars 25 of the mold base 23 in a manner which shall be described hereafter. A biasing compression spring 143 (FIGURE 4) is connected between the foot pedal portion 136 and a spring tab 144 of the air cylinder platform 108.

The operation of the novel mold and loader structure 20 of this invention will be best understood by referring to FIGURES 1 through 10 of the drawings to which attention is now directed. As has been heretofore noted, the sectional mold 21 is particularly adapted for retreading tires and the loader is used to urge a built-up tire into the central matrix section 33, and thereafter remove the cured tire from the mold 21.

The movable matrix sections 34 and 35 are first pivoted from their closed position illustrated in phantom lines in FIGURE 2 to the open position shown in solid lines in the same figure by swinging these sectional matrices about the hinge pins 50. The substantially T-shaped matrix stops 28 support the movable matrix sections 34 and 35 in the open positions thereof as shown in FIGURE 2. Prior to opening the matrix sections 34 and 35 or after the sections have been opened, the mold 21 is rolled on the loader 22 which is secured to a supporting surface. As the mold 21 is rolled on the loader 22, the guide rollers 31 first contact the converging end portions 94 of the guide rails 92 at the guiding surfaces 93. The guiding rollers 31 and the guide rails 92 thus accurately position the loader 22 with respect to the central matrix section 33 of the mold 21.

A tire built-up with camelback is then inserted into the central matrix section 33. The arcuate bead plate 133 is then positioned atop the beads of the tire T in overlying relationship to the central matrix section of the mold as is best illustrated in FIGURE 2 of the drawing. The second pair of connecting arms 120 and the air cylinder connecting arms 124 are moved from the position shown in FIGURE 1 to the position illustrated in FIGURE 4 at which time the piston rod 115 is reciprocated by manipulating the air valve 116 of the air cylinder 114 to align one of the apertures 117 of the piston rod 115 with an aperture 125 in the air cylinder connecting arm 124. The air cylinder connecting arm locking pin 126 is then inserted through these aligned apertures.

The loading screw 130 is then rotated until the enlarged head 132 thereof contacts the bead plate 133 positioned atop the beads of the tire T in the central matrix section 33, as shown in FIGURE 4. It is important to note that the matrix pad 85 secured to the central matrix section 33 is spaced a slight distance away from the floating pad 100 secured atop the back jack connecting arm braces 98 of the back jack connecting arms 96. The pads 85 and 100 are also in alignment with each other due to the cooperation of the guiding rolls 31 of the mold 21 and the guide rails 92 of the loader 22. The mold 21 and the loader 22 are locked in alignment by the latch 141 of the latch arm 137 of FIGURE 7. This latching or locking occurs when the mold 21 is rolled on the loader 22. During this rolling movement, the channel bars 25, and more particularly a rearmost of the channel bars 25, of the base frame 23 coacts with the camming surface 142 of the latch 141 to pivot the latching arms 137 against the tension of the compression spring 143. After the channel bar 25 drops off the camming surface 42 of the latch 141, the biasing spring 143 returns the latch arm 147 to the position shown in FIGURE 7 to lock the base frame 23 of the mold 21 with respect to the loader 22.

The air valve 116 is then actuated to draw the piston 115 into the air cylinder 114. This motion of the piston rod 115 first brings the pads 85 and 100 into contact by drawing the back jack connecting arms 96 and the matrix pad 100 secured thereto upwardly (as viewed in FIGURE 4) into contact with the lower surface 86 of the matrix pad 85. In effect, the back jack connecting arms 96 and the matrix 100 "float" upwardly until the matrix pad 100 abuts the surface 86 of the matrix pad 85 at which time the back jack connecting arms 96 are in spaced relationship along the entire length thereof to the base plate 90 (see FIGURE 6). Continued inward movement of the piston rod 115 with respect to the air cylinder 114 causes downward movement of the loading screw 130 to set or urge the tire T into the central matrix section 33. During the application of this force none of the force is applied to the mold 21, but rather, the force is applied directly to the central matrix section 33 because of the "floating" motion of the pad 100 with respect to the matrix pad 85. The entire force imparted by the air cylinder 114 is applied directly between the pad 100 of the loader 22 and the enlarged head 132 of the loading screw 130, thereby urging the bead plate 133 downwardly (as viewed in FIGURE 4) until the same contacts the insulation plates 40 of the central matrix section 33. At this position, the tire T is fully set within the central matrix section 33 of the mold 21.

The movable matrix sections 34 and 35 are then pivoted closed by a sweeping motion, as heretofore noted, because of the location of the hinge pins 50. This sweeping motion of the matrix sections 34 and 35 prevents the tire T from being pinched during the closing operation. The trunnion or locking assembly 53 is then operated in the manner heretofore noted, it being noted that the movable matrix sections 34 and 35 are properly aligned during the locking thereof by the two alignment devices 72 and the sockets 73.

Once the movable matrix sections 34 and 35 of the mold 21 have been locked, the air valve 116 of the air cylinder 114 is manipulated to reciprocate the piston rod 115 outwardly of the air cylinder 114, thus releasing the force previously applied to the tire T through the loading screw 30 and the pads 85 and 100. The air cylinder connecting arm locking pin 126 is removed and the second and third members 103 and 104, respectively, of the spanning means 101 are folded to the position shown in FIGURE 1. The air cylinder 114 is also pivoted about the hinge pin 111 to an out-of the-way position. The latch 141 (FIGURE 7) is released by stepping on the foot pedal portion 136 and the mold 21 is rolled off the loader 22. FIGURE 8 illustrates the mold 21 after the same has been locked and removed from the loader 22. Thereafter, the mold 21 is rolled to a curing section whereat the switch boxes 51 are connected to a suitable source of electrical energy. The switches (not shown) in the switch boxes 51 are manipulated to adjust the temperature of the sectional matrix assembly 32, and the tire T is cured.

Figure 10:
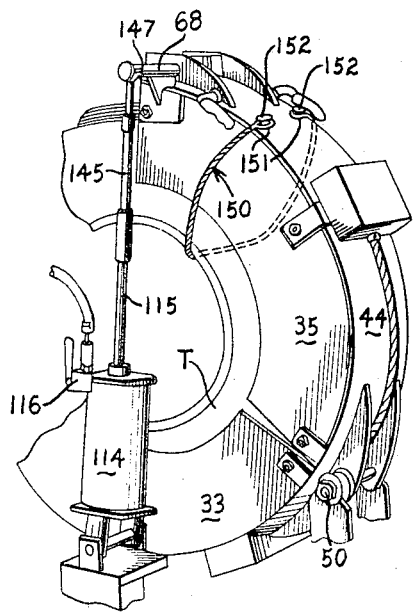
FIGURE 10 is a fragmentary front perspective view of the matrix and a portion of the loader of FIGURE 9, and illustrates a cable substantially encompassing a section of the matrix and the tire therein, and the bifurcated terminal portion of the extension in engagement with a pin of the matrix section.

After the tire T is cured, the mold 21 is again rolled back over the loader 22 and the trunnion or locking assembly 53 is unlocked. To remove the now-cured tire T from the sectional matrix assembly 32, the movable matrix sections 34 and 35 must be again opened by pivoting the same about the hinge pins 50. Because the tire T adheres to the matrix sections 33–35 of the sectional matrix 32 during the curing operation, the opening of the matrix sections 34 and 35 is an extremely difficult operation and virtually incapable of being performed manually. Therefore, an adjustable push rod 145 having a sleeve 146 at one end and a bifurcated portion 147 on another end thereof is attached to the piston rod 115 of the air cylinder 114, as is best illustrated in FIGURES 9 and 10 of drawings. The bifurcated portion 147 of the push rod 145 is placed in underlying abutment with the opening pin 68 secured to the movable matrix section 34. The air valve 116 of the air cylinder 114 is manipulated to reciprocate the piston rod 115 and the push rod attached thereto outwardly and upwardly with respect to the air cylinder 114. This movement forces the matrix section 34 in a counterclockwise direction, as viewed in FIGURE 9, and breaks the inner surface 38 thereof away from the tire T.

The air valve 116 is then manipulated to draw the piston rod 115 away from the opening pin 68 of the matrix section 34, after which, this procedure is once again repeated with respect to the opening pin 68 of the movable matrix section 35 to break the tire T away from the matrix section 35.

When the matrix section 35 has been broken away from the tire T a tire breaking device or tire puller cable 150 comprising a length of steel cable having a loop 151 at each end thereof is fastened to a pair of tire breaking attaching devices 152 secured to the matrix band 44 of the movable matrix section 35. When the tire breaking device 150 is in the position shown in FIGURE 10 of the drawings, the air valve 116 is again actuated to extend the piston rod 115 and the pusher rod 145 attached thereto outwardly of the air cylinder 114. This movement of the piston rod 115 again pivots the movable matrix section 35 in a clockwise direction as viewed in FIGURE 10. The clockwise movement of the matrix section 35 breaks the tire T away from the central matrix section 33 because of the attached tire breaking device 150. Thus, the tire T may now be readily pulled out of the central matrix section 33 after the tire breaking device 150 is released and the matrix section 35 is pivoted about the hinge pin 50 into contact with the substantially T-shaped matrix stop brace 29 of FIGURE 9.

The mold 21 may now be removed from the loader 22 in the manner heretofore discussed, or a second tire may now be inserted in the central matrix section 33 and the loading, curing and unloading operations of the combined mold and loader 20 may again be repeated.

FIGURES 12 and 13 of the drawings show another mold 153 and another loader or loader structure 154, similar to the mold and loader of FIGURES 1 through 10.

The mold 153 includes a sectional matrix 155 comprising an immovable central matrix section 156, a first movable matrix section 157 and a second movable matrix section 158. The matrix sections 157 and 158 are each provided with a pair of hinge plates 160 which pivotally journal the movable matrix sections 157 and 158 to a pair of upstanding hinge plates 161 of a base frame 162. The base frame 162 includes a pair of inverted substantially U-shaped supporting legs 163 and 164 bridged by a pair of channel members 165 (only one of which is illustrated).

The loader 154 of FIGURE 12 is identical to the loader 22 of FIGURES 1 through 10 except that a substantially rectangular base plate 166 of the loader 154 is provided with an identical caster 167 at each corner thereof. Thus, rather than the mold 153 being movable with respect to the loader 154 as is the case of the mold and loader 20 of FIGURE 2, the loader 154 of FIGURES 12 and 13 is movable with repsect to the mold 153. Other than this, the structure, function and operation of the mold 153 and the loader 154 of FIGURES 12 and 13 are identical to the structure, function, and operation of the mold and loader 20 of FIGURES 2 through 10 of the drawings.

A mold 170 constructed in accordance with this invention is illustrated in FIGURE 14 of the drawings and includes a sectional matrix 171. The sectional matrix 171 is substantially identical to the section matrix 32 of FIGURE 2 and includes an immovable central matrix section 172, a first movable matrix section 173 and a second movable matrix section 174. The matrix sections 173 and 174 are hinged to the central matrix section 172 in a manner identical to that heretofore discussed in connection with the mold 20 of FIGURES 1 through 10. The sectional matrix 171 of FIGURE 14 includes a matrix body 175 in each of the matrix sections 172–174. The matrix body 175 is best illustrated in FIGURE 15 and is substantially identical to the matrix body 36 of the matrix section assembly 32 of FIGURES 1 through 10. However, a pair of arcuately extending parallel steam passages 176 are formed in the matrix body 175 of each of the matrix sections 172–174. As is best illustrated in FIGURE 16, adjoining steam passages 176 are connected by a relatively flexible jumper hose 177. A threaded steam coupling 178 secures the jumper hose 177 between adjacent matrix sections 172 and 173. A similar jumper hose (not shown) is connected between the matrix sections 172 and 174. Steam is introduced into the steam passages 176 through either one of the steam fittings 178 of FIGURE 14 to which a jumper hose has not been attached. That is, one of the fittings 178 of FIGURE 14 is used as a steam input connection while the other of the fittings 178 is used as a steam outlet connections. A drain plug 179 in the central matrix section 172 is used to remove condensate from the sectional matrix 171 during the curing operation.

An end shim 180 of FIGURE 17 is shown attached to a face of a matrix section M. The matrix section M may be any one of the matrix sections 33–35, 156–158, or 172–174 heretofore disclosed. The end shim 180 is secured to the face of any one of these matrix sections M by a plurality of screws 181. The purpose of the end shim 180 is to increase the size of any sectional matrix to which the end shim 180 is secured to enable tires of diverse sizes to be cured in a single sized sectional matrix.

As has been heretofore mentioned in connection with the sectional matrix 32 of FIGURES 1 through 10, the lugs 46 of the matrix bands 44 have apertures which are enlarged as compared to the size of the matrix bolts 41. When the matrix bolts 41 are loosened, the enlarged holes of the lugs 46 permit the matrix body 36 of each of the matrices 33–35 to be shifted or slipped with respect to the respective matrix bands 44. The end shims 180 may then be secured to each face of the respective matrices 33–35, the matrix sections thereafter being closed and locked and the matrix bolts 41 tightened. The end shims 180 thus enlarge the circumference of the matrix body 36 allowing the same sectional matrix 32 or mold 21 to handle oversized tires.

While various forms of molds, matrix bodies, loaders and matrix sections have been disclosed herein, it is to be understood that various modifications thereof would be apparent to one skilled in the art, and are within the scope of this invention as defined by the appended claims.

I claim:

1. A tire mold having a plurality of matrix sections pivotally connected to form a substantially annular matrix of a predetermined circumference in a closed position thereof, at least one of said matrix sections being defined by a cavity-defining matrix body and an exterior matrix band secured thereto, said at least one matrix body and an adjacent matrix section each having end faces normally in adjacent contiguous opposed relationship in said closed position, and means for varying said predetermined circumference to adapt said mold for receiving different sized uncured tires, said circumference varying means being defined by means for relatively shifting at least said one matrix body relative to the matrix band thereof to space said adjacent end faces beyond said normal closed position thereby forming a space adapted to receive a shim for increasing said predetermined circumference in said closed position.

2. The tire mold as defined in claim 1 including a shim positioned in said space.

3. The tire mold as defined in claim 1 including a shim positioned in said space, and means securing said shim to said one matrix body.

4. The tire mold as defined in claim 1 including insulating means between said one mold body and said exterior matrix band.

5. The tire mold as defined in claim 1 including hinge means connected to said matrix band and said adjacent matrix section for pivotally connecting the same together.

6. The tire mold as defined in claim 5 including insulating means between said one mold body and said exterior matrix band.

7. The tire mold as defined in claim 6 including a shim positioned in said space.

8. The tire mold as defined in claim 6 including a shim positioned in said space and insulating means between said one matrix body and said exterior matrix band.

9. The tire mold as defined in claim 1 including a matrix pad carried externally of and beneath said exterior matrix band, and means for supporting said matrix with said matrix pad in spaced relationship to a supporting surface.

10. The tire mold as defined in claim 1 wherein said means for permitting relative shifting between said one matrix body relative to the matrix band thereof is a plurality of bolts passing through apertures in portions of said exterior matrix band and said one matrix body, and at least some of said apertures are oversize relative to said bolts for effecting the relative shifting between said exterior matrix band and said one matrix body.

References Cited

UNITED STATES PATENTS

| 1,335,783 | 4/1920 | Dorsey. | |
|---|---|---|---|
| 1,368,268 | 2/1921 | Legnard | 18—18 X |
| 1,429,831 | 9/1922 | Barney | 18—18 |
| 1,643,712 | 9/1927 | Henson | 18—18 |
| 1,996,971 | 4/1935 | Murphy | 18—18 |
| 2,228,316 | 1/1941 | James | 18—18 |
| 2,372,217 | 3/1945 | MacMillan | 18—18 |
| 2,456,063 | 12/1948 | James II | 18—18 |
| 2,606,342 | 8/1952 | Kraft | 18—18 |
| 2,723,425 | 11/1955 | Mattox et al. | 18—18 |
| 2,866,228 | 12/1958 | French | 18—18 |
| 3,042,966 | 7/1962 | Laycox | 18—18 X |
| 2,228,316 | 1/1941 | James | 18—18 |
| 2,370,655 | 3/1945 | Glyn | 18—18 |
| 2,411,687 | 11/1946 | James | 18—18 |
| 2,516,715 | 7/1950 | Moore | 18—18 |
| 2,866,228 | 12/1958 | French | 18—18 |

J. HOWARD FLINT, JR., *Primary Examiner.*

U.S. Cl. X.R.

18—2